(12) United States Patent
    Kanaoka et al.

(10) Patent No.: US 11,030,507 B2
(45) Date of Patent: Jun. 8, 2021

(54) ANTENNA FOR RF TAG, AND RF TAG

(71) Applicant: PHOENIX SOLUTION CO., LTD., Kanazawa (JP)

(72) Inventors: Hisao Kanaoka, Kanazawa (JP); Shiro Sugimura, Kanazawa (JP); Tatsuji Niwata, Kanazawa (JP); Masakazu Fujii, Kanazawa (JP)

(73) Assignee: PHOENIX SOLUTION CO., LTD., Ishikawa (JP)

( * ) Notice: Subject to any disclaimer, the term of this patent is extended or adjusted under 35 U.S.C. 154(b) by 0 days.

(21) Appl. No.: 16/766,867

(22) PCT Filed: Nov. 29, 2017

(86) PCT No.: PCT/JP2017/042916
§ 371 (c)(1),
(2) Date: May 26, 2020

(87) PCT Pub. No.: WO2019/106772
PCT Pub. Date: Jun. 6, 2019

(65) Prior Publication Data
US 2020/0302259 A1     Sep. 24, 2020

(51) Int. Cl.
G06K 19/077     (2006.01)
H01Q 1/22       (2006.01)

(52) U.S. Cl.
CPC ....... G06K 19/0772 (2013.01); H01Q 1/2208 (2013.01)

(58) Field of Classification Search
None
See application file for complete search history.

(56) References Cited

FOREIGN PATENT DOCUMENTS

| JP | H03-192804 A | 8/1991 |
|----|--------------|--------|
| JP | 2001-156529 A | 6/2001 |
| JP | 2003-298345 A | 10/2003 |
| JP | 2004-040680 A | 2/2004 |

(Continued)

OTHER PUBLICATIONS

International Search Report for PCT/JP2017/042916, dated Feb. 13, 2018.
Japanese Office Action for JP 2016-155928, dated Nov. 26, 2019.

*Primary Examiner* — Kristy A Haupt
(74) *Attorney, Agent, or Firm* — Pearne & Gordon LLP

(57) ABSTRACT

[Problem] To provide an antenna for an RF tag and an RF tag with which a communication distance between reading devices can be extended. [Solution] This antenna for an RF tag is provided with: an insulation member 40; a waveguide element 20 provided on one side of the insulation member 40; a waveguide element 30 disposed so as to face the waveguide element 20 and provided on the other side of the insulation member 40; a power supply unit 50 having one end electrically connected to the waveguide element 30; and a short-circuit unit 60 having one end electrically connected to the wave guide element 20 and the other end electrically connected to the waveguide element 30, wherein the permittivity of an insulation region A1 on the waveguide element 20 side among regions sandwiched between the waveguide element 20 and the waveguide element 30 is different from the permittivity of an insulation region A2 on the waveguide element 30 side among said regions.

13 Claims, 9 Drawing Sheets

(56) References Cited

FOREIGN PATENT DOCUMENTS

| | | |
|---|---|---|
| JP | 2004-228940 A | 8/2004 |
| JP | 4379470 B2 | 12/2009 |
| JP | 2010-081098 A | 4/2010 |
| JP | 2010-154207 A | 7/2010 |
| JP | 2011-130239 A | 6/2011 |
| JP | 2011-135549 A | 7/2011 |
| JP | 2011-211748 A | 10/2011 |
| JP | 2012-253700 A | 12/2012 |
| JP | 2013-110685 A | 6/2013 |
| JP | 2014-103515 A | 6/2014 |
| WO | 2013/137404 A1 | 9/2013 |
| WO | 2016/129542 A1 | 8/2016 |
| WO | WO-2016129542 A1 * 8/2016 ........... G06K 19/077 |

* cited by examiner

ANTENNA FOR RF TAG, AND RF TAG

TECHNICAL FIELD

The present invention relates to an RF tag antenna and an RF tag.

BACKGROUND ART

In recent years, in various fields such as logistics, RFID systems using RFID (radio frequency identification) have been studied.

In an RF tag for use in an RFID system, an antenna and an IC chip are provided. The RF tag receives, using the antenna of the RF tag, radio waves (carrier wave) transmitted from a reading device. And the RF tag sends, as a response thereto, identification data and the like recorded in the IC chip to the reading device by carrying the data and the like on a reflected wave. By virtue of this, it is made possible to perform communications between the RF tag and the reading device without bringing the reading device into contact with the RF tag. Some reading devices such as a reader/writer have a writing function to write information to the RF tag.

Patent Literature 1 discloses, as an antenna of an RF tag, a patch antenna that includes a plate-like radiation conductor and a conductor ground plane (ground conductor) which are arranged on the front and back surfaces, respectively, of a dielectric substrate. Patent Literature 2 discloses a patch antenna that has a configuration in which a magnetic sheet sandwiched between an antenna section and a conductor ground plane.

CITATION LIST

Patent Literature

Patent Literature 1: Japanese Patent No. 4379470
Patent Literature 2: Japanese Patent Application Laid-Open No. 2013-110685

SUMMARY OF INVENTION

Technical Problem

In RFID systems, there have been strong demands for extended communication distance between an RF tag and a reading device in terms of improved usability.

In view of this, an object of the present invention is to provide an RF tag antenna and an RF tag that make it possible to extend the communication distance with the reading device.

Solution to Problem

An RF tag antenna in accordance with the present invention includes an insulation member; a first waveguide element provided on one side of the insulation member; a second waveguide element arranged so as to face the first waveguide element, the second waveguide element being provided on another side of the insulation member; a power feeding section having one end electrically connected to the second waveguide element; and a short circuit section having one end electrically connected to the first waveguide element and another end electrically connected to the second waveguide element, in which the first waveguide element, the second waveguide element, the insulation member, the power feeding section, and the short circuit section constitute a planar inverted-F antenna configured to receive radio waves transmitted from a reading device; and a first insulating region and a second insulating region are defined within a region between the first waveguide element and the second waveguide element, the first insulating region faces the first waveguide element, the second insulating region faces the second waveguide element, a permittivity of the first insulating region and a permittivity of the second insulating region is different from one another.

Also, in the RF tag antenna, the permittivity of the first insulating region may be smaller than the permittivity of the second insulating region when the first waveguide element functions as a waveguide conductor that absorbs the radio waves and the second waveguide element functions as a ground conductor.

Also, in the RF tag antenna, the insulation member may have a first main surface on one side and a second main surface on the other side, and a plurality of bottomed holes may be provided in the first main surface.

Also, in the RF tag antenna, diameters of the bottomed holes may be gradually reduced from the first main surface toward the second main surface.

Also, in the RF tag antenna, the insulation member may have a first main surface on one side and a second main surface on the other side, and raised and depressed sections may be formed in the first main surface and/or second main surface.

Also, in the RF tag antenna, the shapes of raised and depressed sections may be different from each other on the first main surface and the second main surface.

Also, in the RF tag antenna, the insulation member may have a first main surface on one side and a second main surface on the other side, the insulation member may have a first insulating substrate including the first main surface and a second insulating substrate including the second main surface, and the permittivity of the first insulating substrate and the permittivity of the second insulating substrate may be different from each other.

An RF tag in accordance with the present invention is an RF tag that includes an RF tag antenna in accordance with the present invention and an IC chip that operates based on the radio waves transmitted from the reading device, in which the second waveguide element is arranged such that it is in contact with a conductor, and the permittivity of the second insulating region is larger than the permittivity of the first insulating region.

An RF tag in accordance with the present invention is an RF tag that includes an RF tag element including an RF tag antenna in accordance with the present invention and an IC chip that operates based on the radio waves transmitted from the reading device; and a case that accommodates the RF tag element, in which the case has a mounting unit for mounting the RF tag to a target object of mounting.

Also, in the RF tag, the case may be configured such that the position of the short circuit section is visible from the outside of the case.

Also, in the RF tag, a biasing member that presses the RF tag element toward to the second inner surface facing the first inner surface may be provided in the gap between the RF tag element and the first inner surface of the case.

Also, in the RF tag, the case may be made of a conductive material, and an opening through which radio waves transmitted from the reading device pass may be provided in the case.

Advantageous Effect of Invention

According to the present invention, it is made possible to provide an RF tag antenna and an RF tag that make it possible to extend the communication distance with the reading device.

DESCRIPTION OF EMBODIMENTS

Figure 1A:
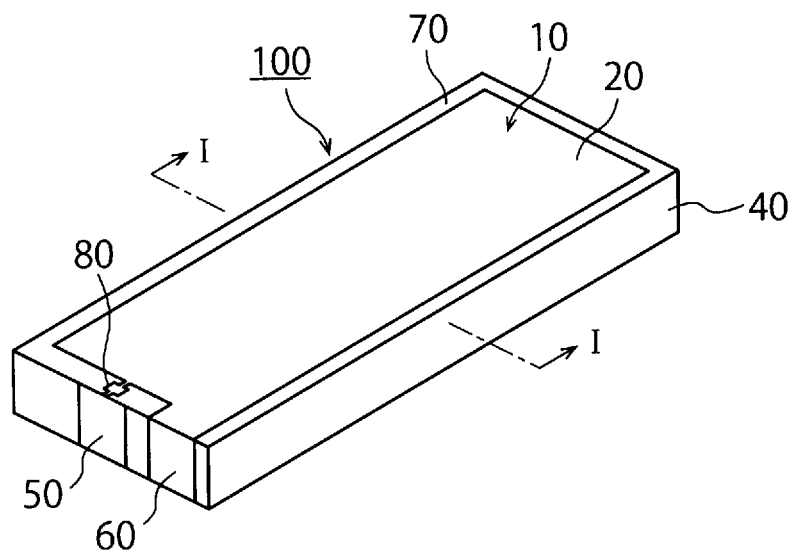
FIG. 1A is a perspective view of an RF tag element in accordance with an embodiment viewed from above.

Hereinafter, embodiments of the present invention will be described with reference to the drawings. Note that, in each of the drawings, components having the same or equivalent functions are denoted by the same reference numerals.

First, an RF tag antenna 10 and an RF tag element 100 in accordance with the embodiment will be described.

Figure 1B:
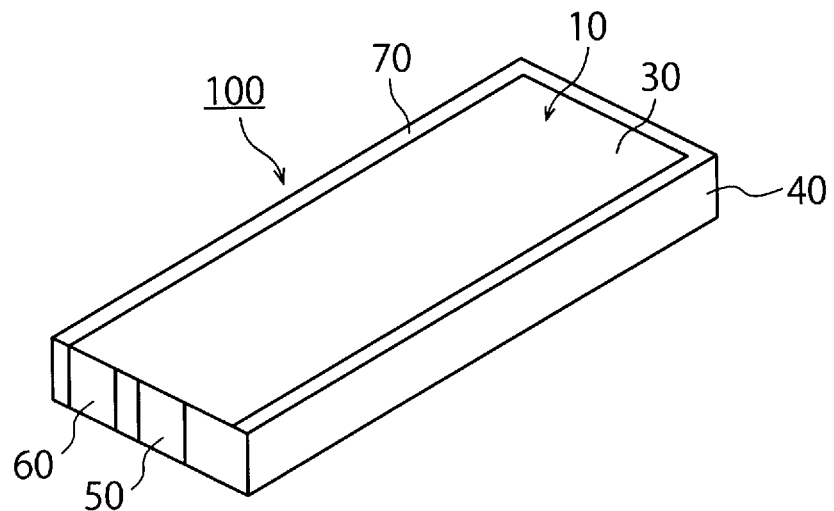
FIG. 1B is a perspective view of the RF tag element in accordance with the embodiment viewed from below.

As illustrated in FIG. 1A and FIG. 1B, the RF tag element 100 includes an RF tag antenna 10 that receives radio waves transmitted from a reading device; and an IC chip 80 that operates based on the radio waves.

The RF tag antenna 10 includes a waveguide element 20 (first waveguide element), a waveguide element 30 (second waveguide element), an insulation member 40, a power feeding section 50, a short circuit section 60, and an insulating sheet 70.

The waveguide element 20, the waveguide element 30, the insulation member 40, the power feeding section 50, and the short circuit section 60 constitute a planar inverted-F antenna that receives radio waves transmitted from the reading device (not shown). When the waveguide element 20 functions as a waveguide conductor that absorbs radio waves, then the waveguide element 30 functions as a conductor ground plane. On the other hand, when the waveguide element 30 functions as a waveguide conductor, then the waveguide element 20 functions as the conductor ground plane. In other words, the waveguide elements 20 and 30 perform both of the functions of a waveguide conductor and a conductor ground plane depending on the mode of usage of the RF tag element 100.

The IC chip 80 is arranged, as illustrated in FIG. 1A, in the same plane as the waveguide element 20, and is arranged between the waveguide element 20 and the power feeding section 50. Note that the IC chip 80 may be arranged on a side surface of the insulation member 40 within the range where it functions as the planar inverted-F antenna. Also, an external power source may be connected to the IC chip 80 and the IC chip 80 may be configured to operate by the voltage supplied from the external power source.

The IC chip 80 is configured to operate based on the radio waves received by the planar inverted-F antenna of the RF tag antenna 10. Specifically, the IC chip 80 first rectifies part of the carrier waves transmitted from the reading device and generates power supply voltage necessary for the operation. Then the IC chip 80 uses the generated power supply voltage to operate the control logic circuit in the IC chip 80 or a non-volatile memory unit that stores product-specific information or the like. Also, the IC chip 80 operates a communication circuit for performing transmission and reception of data to/from the reading device or any other relevant circuits.

Next, the individual components of the RF tag antenna 10 will be described in detail.

The waveguide element 20 is provided on one side of the insulation member 40. The waveguide element 30 is arranged such that it faces the waveguide element 20, and is provided on the other side of the insulation member 40.

In this embodiment, the waveguide element 20 is provided on a first main surface (a main surface on one side) of a substantially rectangular parallelepiped insulation member 40, and the waveguide element 30 is provided on a second main surface (a main surface on the other side) of the insulation member 40. Note that an insulating coating may be formed on the surface of the waveguide element 20 and the waveguide element 30.

As illustrated in FIGS. 1A and 1B, the waveguide element 20 and the waveguide element 30 both have a substantially rectangular shape. In this manner, it is desirable that the waveguide element 20 and the waveguide element 30 have the same shape. Note that the "same shape" is not limited to identity in a strict sense but should be construed as covering cases where a slight difference may occur due to the antenna structure.

For example, if the IC chip 80 is provided in the same plane as the waveguide element 20 (see FIG. 1A), it is necessary to create a cutout section in part of the quadrangular waveguide element 20. In this case, the waveguide element 20 and the waveguide element 30 in a strict sense do not have the same shape, but they are regarded as having the same shape in the context of this patent application.

The planar shape of the waveguide element 20 and the waveguide element 30 is not limited to a rectangular shape. For example, the waveguide element 20 and the waveguide element 30 may have a shape whose central portion is cut out (i.e., a hollow rectangle shape).

It is preferable that the sum of lengths of the sides of the waveguide element 20 be $\lambda/4$, $\lambda/2$, $3\lambda/4$, or $5\lambda/8$. Here, $\lambda$ is the wavelength of the radio waves transmitted from the reading device. Note that the wavelength $\lambda$ of the radio waves is not limited to a particular one as long as the wavelength $\lambda$ is one which can be used in an RF tag. With regard to the sum of lengths of the sides of the waveguide element 30 as well, it is preferable that the sum be $\lambda/4$, $\lambda/2$, $3\lambda/4$, or $5\lambda/8$.

The insulation member 40 is, for example, a dielectric body having a relative permittivity of 1 or more and 20 or less (for example, synthetic resin such as ABS resin, ceramic, styrofoam, etc.). If a dielectric body having a large permittivity (e.g., ceramic) is used, then the capacitor (the capacitor 90 which will be described later) constituted by the waveguide element 20, the waveguide element 30, and the insulation member 40 will have a large capacitance, so that the area of the opening of the waveguide elements 20 and 30 becomes small, which makes it possible to reduce the size of the RF tag element 100.

Meanwhile, since the gain of the RF tag antenna 10 becomes small, the distance of possible communications with the reading device (communication distance) becomes short. In the case where a relatively long communication distance in the order of several meters or more is necessary, it is preferable that a dielectric body having a small permittivity (e.g., relative permittivity of 5 or less, more preferably, for example, relative permittivity of 2 or less) be used as the insulation member 40.

Also, as the insulation member 40, materials such as non-woven fabric, a Teflon (registered trademark) foam member, a silicone foam member, PPS (polyphenylene sulfide), PP (polypropylene), any other suitable super engineering plastics, PES, PEI, PAI, PEEK, PTFE, PC, PA, PET, PBT, etc., or any other suitable composite materials thereof may be used.

Figure 3:
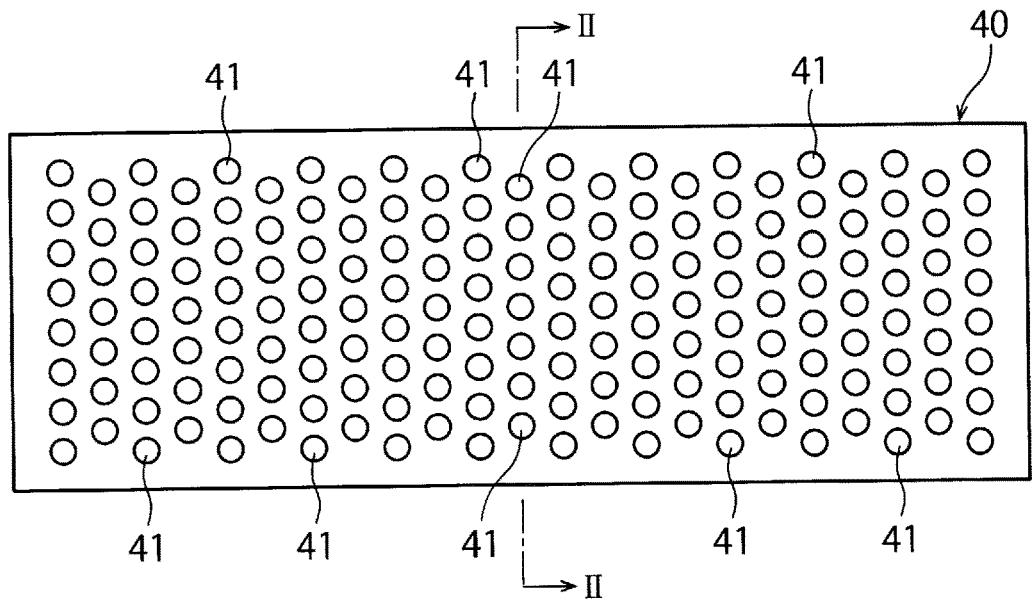
FIG. 3 is a plan view of an insulation member in accordance with the embodiment.
Figure 4:
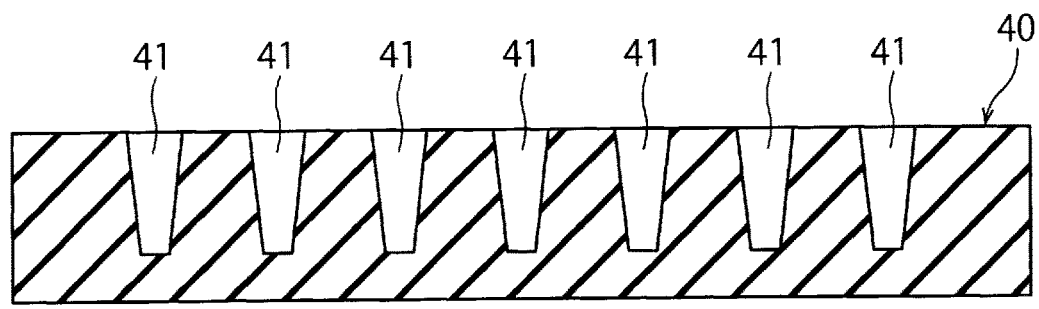
FIG. 4 is a cross-sectional view taken along the line II-II of FIG. 3.

The insulation member 40 has a substantially rectangular parallelepiped shape, and has a first main surface and a second main surface on the other side of the first main surface. As illustrated in FIGS. 3 and 4, the insulation member 40 has a plurality of bottomed holes 41 provided in the first main surface. These bottomed holes 41 are formed, for example, by cutting the insulation member 40 with a drill.

Figure 2:
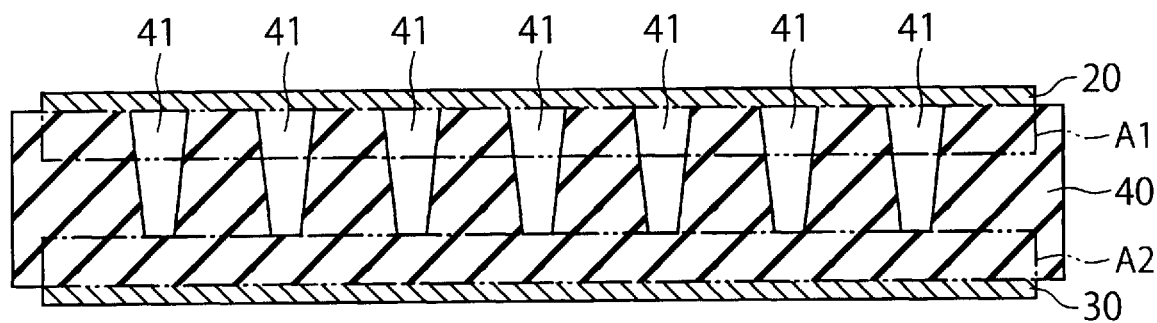
FIG. 2 is a cross-sectional view taken along the line I-I of FIG. 1A in the embodiment.

By providing the multiple bottomed holes 41 in the insulation member 40, as illustrated in FIG. 2, it is ensured that the permittivity of the insulating region A1 facing the waveguide element 20 (first insulating region) in the region between the waveguide element 20 and the waveguide element 30 and the permittivity of the insulating region A2 facing the waveguide element 30 (second insulating region) in the same region are made different from each other. More specifically, since the inside of the bottomed hole 41 is filled with air, the permittivity of the insulating region A1 becomes smaller than the permittivity of the insulating region A2.

Here, the insulating region A1 is a region in contact with the waveguide element 20, and includes at least a region in the vicinity of the waveguide element 20 within the region between the waveguide element 20 and the waveguide element 30. Likewise, the insulating region A2 is a region in contact with the waveguide element 30, and includes at least a region in the vicinity of the waveguide element 30 within the region between the waveguide element 20 and the waveguide element 30.

If the permittivity of the insulating region A1 is smaller than the permittivity of the insulating region A2, then the waveguide element 20 has a larger opening area than the waveguide element 30. As a result, the waveguide element 20 serves as the waveguide conductor (radiation conductor) that absorbs the radio waves radiated from the reading device and the waveguide element 30 serves as the ground conductor. On the other hand, if the permittivity of the insulating region A1 is larger than the permittivity of the insulating region A2, then the waveguide element 20 serves as the ground conductor and the waveguide element 30 serves as the waveguide conductor.

Note that the shape of the bottomed hole 41 provided in the insulation member 40 is not limited to a circular shape as illustrated in FIG. 3 and may be any other suitable shape (elliptical shape, polygonal shape, star shape, etc.).

Also, it is preferable that the bottomed holes 41 have, as illustrated in FIG. 4, a diameter that gradually reduces from the first main surface of the insulation member 40 toward the second main surface thereof. By virtue of this, the permittivity of the insulating region between the waveguide element 20 and the waveguide element 30 can be changed gradually and smoothly.

Also, the shape of the insulation member 40 is not limited to a rectangular parallelepiped shape described above and, for example, may be a disc-like shape, or a cross section thereof may be curved in the form of an arc. Also, the insulation member 40 may have a shape corresponding to the surface shape of the target object of mounting to which the RF tag element 100 should be mounted.

The power feeding section 50 is provided in the side surface of the insulation member 40 with one end thereof electrically connected to the waveguide element 30, and the other end thereof electrically connected via the IC chip 80 to the waveguide element 20.

The short circuit section 60 is provided in the side surface of the insulation member 40 with one end thereof electrically connected to the waveguide element 20 and with the other end thereof electrically connected to the waveguide element 30.

The sheet 70 is made of, for example, flexible insulating materials such as PET, polyimide, and vinyl. The thickness of this sheet 70 is not particularly limited but is generally in the order of several tens of micrometers (μm).

Figure 1C:
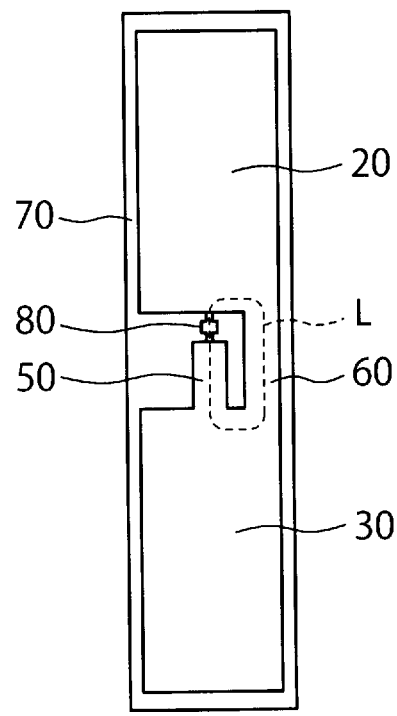
FIG. 1C is an exploded view of a sheet of the RF tag element in accordance with the embodiment.

Formed on the sheet 70, as illustrated in FIG. 1C, are the waveguide element 20, the waveguide element 30, the power feeding section 50, and the short circuit section 60. In addition, the waveguide element 20, the waveguide element 30, the power feeding section 50, and the short circuit section 60 are attached to the insulation member 40 via the sheet 70 which is bent at a portion at a side of the insulation member 40.

As illustrated in FIG. 1A, the power feeding section 50 and the short circuit section 60 are provided on the sheet 70 in parallel with each other in the form of a bridge between the waveguide element 20 and the waveguide element 30.

Note that the power feeding section 50 and the short circuit section 60 do not always need to be provided in parallel with each other.

The waveguide element 20, the waveguide element 30, the power feeding section 50, and the short circuit section 60 are formed by etching a thin metal film such as aluminum formed so as to cover the entire surface of the sheet 70.

Alternatively, they may be formed, for example, by pattern printing using conductive ink, etc.

Note that the sheet 70 is not an essential feature and, the waveguide element 20, the waveguide element 30, the power feeding section 50, and the short circuit section 60 may be provided on the insulation member 40 with no sheet 70 provided in between. For example, the waveguide element 20 and the waveguide element 30 may be separately formed and directly attached to the insulation member 40. Alternatively, the waveguide element 20 and the waveguide element 30 may be formed on the sheet 70, the sheet 70 may be detached therefrom, and then they may be directly attached to the insulation member 40.

Figure 5:
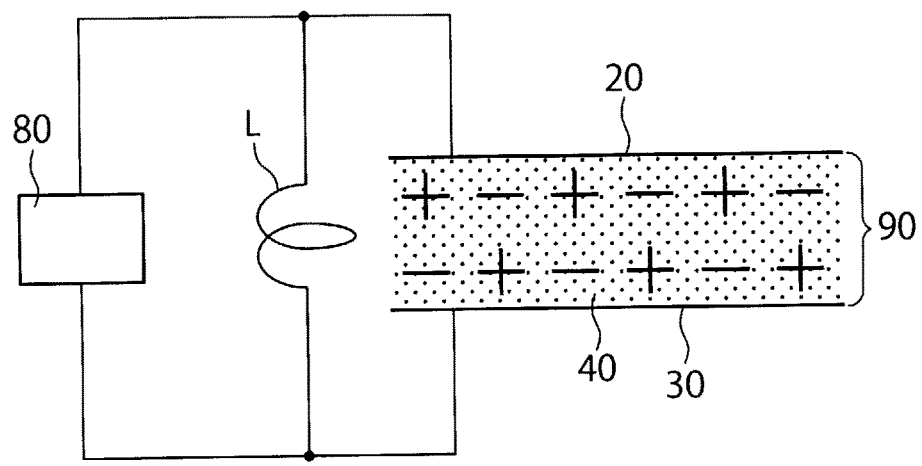
FIG. 5 is a diagram of an equivalent circuit of the RF tag element in accordance with the embodiment.

Next, the operation of the above-described RF tag element 100 will be described with reference to FIG. 5. In the RF tag element 100, a resonance circuit is configured which resonates in the frequency band of the radio waves received by the planar inverted-F antenna. This resonance circuit is configured, as illustrated in FIG. 5, by an inductor pattern L and a capacitor 90. Here, the inductor pattern L is configured, as illustrated in FIG. 1C, by the waveguide element 20, the short circuit section 60, the waveguide element 30, and the power feeding section 50. The capacitor 90 is configured by the waveguide element 20, the waveguide element 30, and the insulation member 40.

As illustrated in FIG. 5, in the equivalent circuit of the RF tag element 100, the inductor pattern L, the capacitor 90, and the IC chip 80 are connected in parallel with one another. The inductor pattern L, the capacitor 90, and the IC chip 80 constitute the resonance circuit that resonates in the frequency band of the radio waves transmitted from the reading device. The resonance frequency f (Hz) of this resonance circuit is given by the expression (1). The value of the resonance frequency f is specified such that it is included in the frequency band of the radio waves transmitted from the reading device.

[Math 1]

$$f = \frac{1}{2\pi\sqrt{L_a \cdot (C_a + C_b)}} \quad (1)$$

Here, La is the inductance of the inductor pattern L; Ca is the capacitance of the capacitor 90; and Cb is the equivalent capacitance inside the IC chip 80. Note that, for example, a capacitance value disclosed as one of the specifications of the IC chip in use can be used as Cb.

By virtue of the above-described resonance circuit, it is made possible for the planar inverted-F antenna to receive with high sensitivity the radio waves transmitted from the reading device. Consequently, the reading performance of the RF tag element 100 can be enhanced. Further, the power supply voltage generated by the IC chip 80 can be increased.

Note that the IC chip 80 has a floating capacitance. Also, the IC chip 80 may be one which incorporates a capacitor. As a result, when the resonance frequency of the resonance circuit is to be specified, it is preferable that the equivalent capacitance inside the IC chip 80 be taken into account. In other words, it is preferable in terms of increased reception sensitivity that the resonance circuit has a resonance frequency specified taking into account the inductance of the inductor pattern L, the capacitance of the capacitor 90, and the equivalent capacitance inside the IC chip 80.

In the RF tag element 100 in accordance with this embodiment, as discussed in the foregoing, the waveguide elements 20 and 30 are capable of performing both functions of the waveguide conductor and the conductor ground plane depending on the mode of usage of the RF tag element 100. In addition, in the case where the waveguide element 20 functions as the waveguide conductor and the waveguide element 30 functions as the ground conductor, the permittivity of the insulating region A1 on the radiation side is smaller than the permittivity of the insulating region A2 on the ground side. According to this embodiment, by providing a plurality of bottomed holes 41 in one main surface of the insulation member 40, the permittivity of the insulating region A1 facing the waveguide element 20 is made smaller than the permittivity of the insulating region A2 facing the waveguide element 30. By virtue of this, since the opening area on the radiation side is increased, the communication distance between the RF tag element 100 and the reading device can be extended without increase in the size of the RF tag element 100.

Note that the configuration of the insulation member 40 is not limited to that which has been described in the foregoing and various configurations can be contemplated. While two modified examples will be described below, the same effect as that of the above-described embodiment can be obtained in either case.

Modified Example 1

Figure 6:
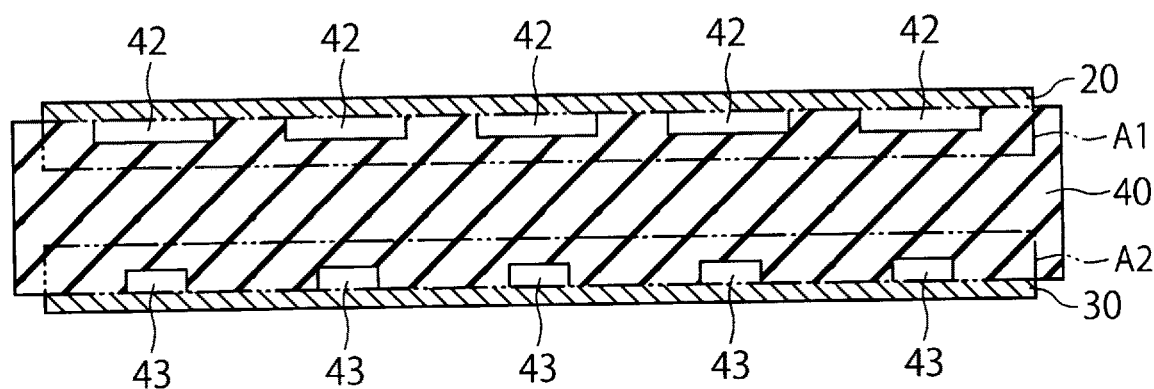
FIG. 6 is a cross-sectional view taken along the line I-I of FIG. 1A in the case of Modified Example 1 of the embodiment.
Figure 7:
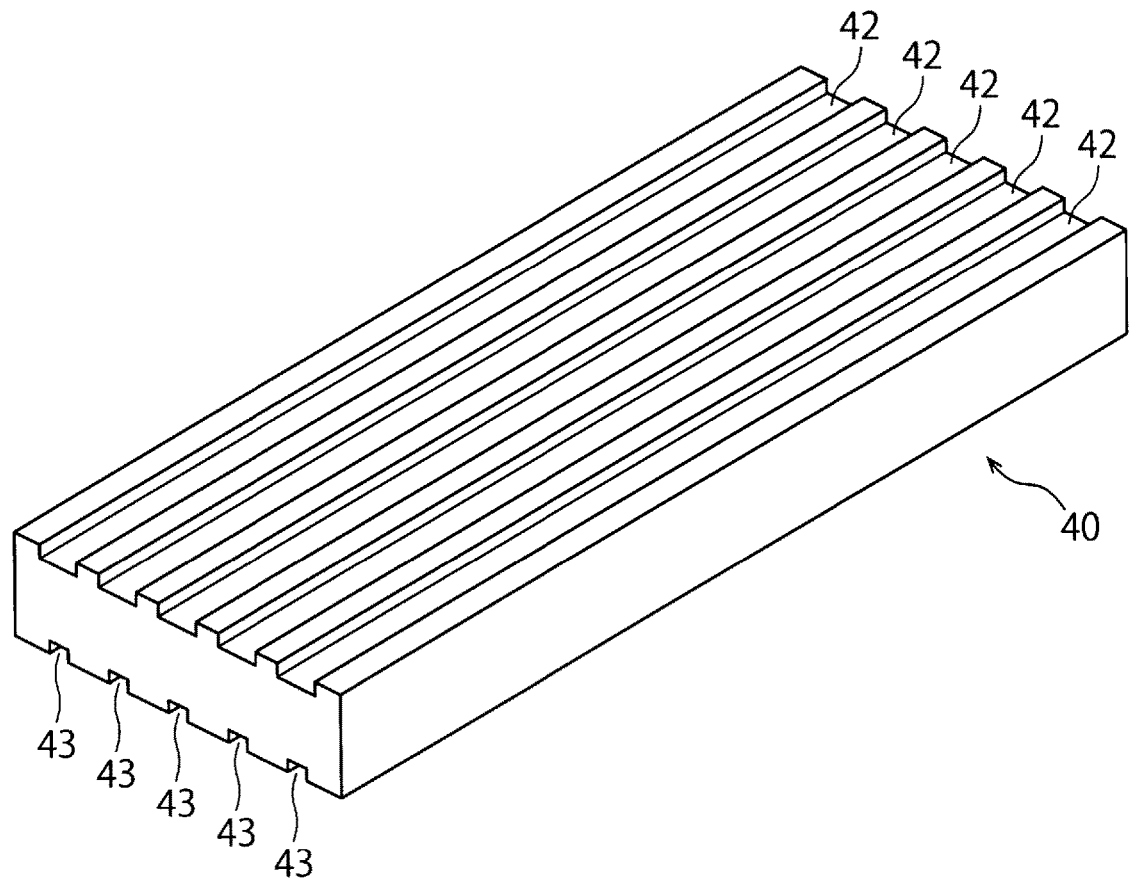
FIG. 7 is a perspective view of an insulation member in accordance with Modified Example 1 of the embodiment.

Modified Example 1 will be described with reference to FIGS. 6 and 7. FIG. 6 illustrates a cross-sectional view taken along the line I-I of FIG. 1A in the case of Modified Example 1. FIG. 7 illustrates a perspective view of the insulation member 40 in Modified Example 1.

In Modified Example 1, a plurality of grooves 42 are provided, in the shape of stripes, in the first main surface of the insulation member 40, and a plurality of grooves 43 are provided, in the shape of stripes, in the second main surface thereof. As illustrated in FIG. 6, the width of the grooves 42 is wider than the width of the grooves 43. As a result, the permittivity of the insulating region A1 becomes smaller than the permittivity of the insulating region A2. The waveguide element 20 and the waveguide element 30 are supported by the raised sections of the raised and depressed sections formed on the main surface of the insulation member (i.e., the portions other than the grooves).

Note that the permittivity may be changed by changing the number of the grooves. For example, five grooves 42 may be formed in the first main surface of the insulation member 40 and three grooves having the same width as the groove 42 may be formed in the second main surface.

Also, by forming raised and depressed sections other than stripe-shaped grooves in the first main surface and/or the second main surface, the permittivity of the insulating region A1 and the permittivity of the insulating region A2 may be made different from each other. The planar shape of the raised and depressed sections can take any suitable shape such as multiple concentric shapes, lattice-like shape, waveform-like shape, etc. By forming raised and depressed sections having shapes different from one another in the first main surface and the second main surface, the permittivity of the insulating region A1 and the permittivity of the insulating region A2 may be made different from each other.

The permittivity of the insulating region A1 becomes smaller as the area of contact between the waveguide element 20 and the insulation member 40 becomes smaller. Consequently, by ensuring that the area of contact between the waveguide element 20 and the insulation member 40 is smaller than the area of contact between the waveguide element 30 and the insulation member 40, it is made possible to make the permittivity of the insulating region A1 smaller than the permittivity of the insulating region A2.

Modified Example 2

Figure 8:
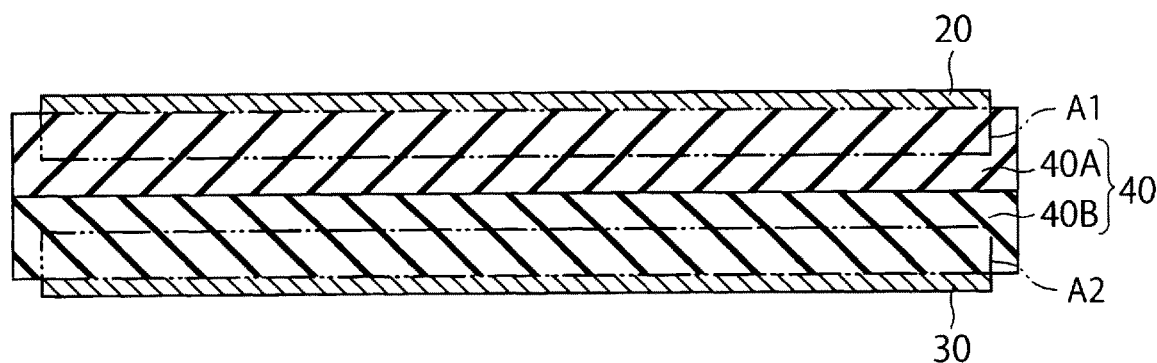
FIG. 8 is a cross-sectional view taken along the line I-I of FIG. 1A in the case of Modified Example 2 of the embodiment.

Modified Example 2 will be described with reference to FIG. 8. FIG. 8 illustrates a cross-sectional view taken along the line I-I of FIG. 1A in the case of Modified Example 2.

In Modified Example 2, the insulation member 40 has an insulating substrate 40A having a first main surface and an insulating substrate 40B having a second main surface. The insulating substrate 40A and the insulating substrate 40B are overlaid on each other so as to constitute the insulation member 40 with a tow-layer structure. In addition, the permittivity of the insulating substrate 40A and the permittivity of the insulating substrate 40B are different from each other. For example, the insulating substrate 40A is made of materials having lower insulation rate than the insulating substrate 40B. Alternatively, the insulating substrate 40A and the insulating substrate 40B may be made of the same material and the insulation rates of them can be made different from each other by changing the number and size of the voids inside thereof.

Note that the insulation member 40 may be configured by three or more layers of insulating substrate.

In addition to the above-described Modified Examples 1 and 2, an insulation member may be used which has a flat-plate section and a plurality of pillar portions provided on an upper surface of this flat-plate section so as to protrude therefrom. In this case, the waveguide element 20 is provided on the plurality of pillar portions and the waveguide element 30 is provided on the lower surface of the flat-plate section.

<Installation of the RF Tag Element>

Figure 9:
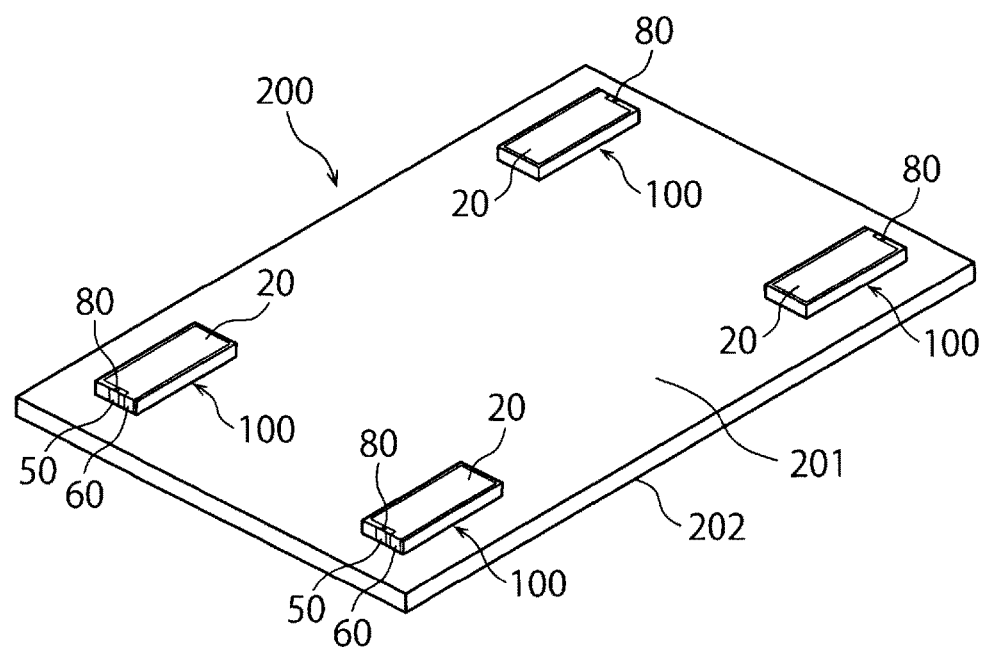
FIG. 9 is a perspective view illustrating a preferred example of arrangement of a plurality of RF tag elements on a conductor.

Next, installation of the RF tag element 100 will be described with reference to FIG. 9. FIG. 9 illustrates a state where the RF tag element 100 is installed on an installation surface 201 of a conductor (target object of mounting) 200. The RF tag element 100 is installed such that the waveguide element 30 is in contact with the conductor 200. The RF tag element which is directly mounted to the target object of mounting such as the conductor 200 can be regarded as an RF tag that does not have a case (the cases 300, 500, etc. which will be described later) that accommodates therein the RF tag element.

In this patent application, the state where "the waveguide element is in contact with the conductor" is not limited to a case where the waveguide element is in direct contact with the conductor and may encompass a state where the waveguide element can be regarded as being electrically connected to the conductor. In other words, a state where a certain substance (seal, adhesive, etc.) resides between the waveguide element and the conductor should also be encompassed by the state where the waveguide element is in contact with the conductor. Also, the "conductor" in this patent application is a "generic term for substances having relatively high electrical conductivity" in the same manner as in the general lexicographical meaning, a typical example of which is metal. Meanwhile, the "conductor" is not limited to metal and may be, for example, a human body, plants, water, ground, etc.

In the RF tag element 100 installed on a conductor 200, the waveguide element 30 is electrically connected to the conductor 200 and the conductor 200 receives radio waves together with the waveguide element 30. In other words, since the RF tag antenna 10 is a planar inverted-F antenna, the waveguide element 30 and the conductor 200, as one single waveguide element having a large opening area, are capable of absorbing (receiving) the radio waves of the reading device.

Accordingly, it is made possible to ensure enhanced sensitivity of the planar inverted-F antenna.

It may also be ensured that the permittivity of the insulating region A2 be larger than the permittivity of the insulating region A1. By virtue of this, the sensitivity of the planar inverted-F antenna can be further enhanced and the communication distance can be extended.

Note that, if a plurality of RF tag elements 100 are arranged on a rectangular conductor 200, then, as illustrated in FIG. 9, it is preferable that the plurality of RF tag elements 100 be installed such that the short circuit section 60 of each RF tag element 100 is oriented toward the end (side) of the conductor 200 and that the short circuit section 60 is positioned on the inner side relative to the side of the conductor 200. By arranging them in this manner, the return loss is reduced, as a result of which the operation efficiency of the RF tag element 100 is enhanced, which in turn makes it possible to efficiently emit the radio waves.

<RF Tag>

Next, an RF tag 1 will be described in which the RF tag element 100 that has been described in the foregoing is accommodated in the case.

Figure 10:
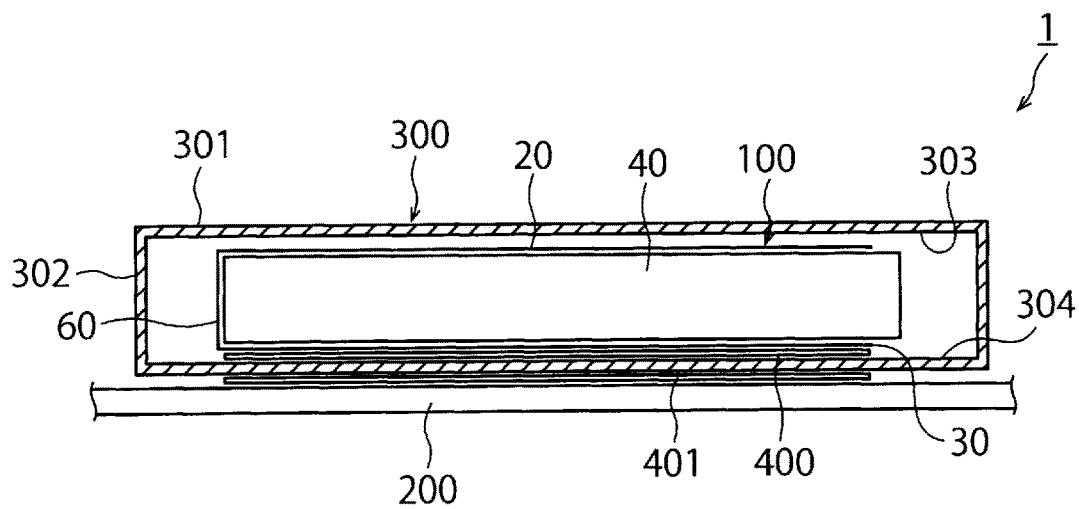
FIG. 10 is a longitudinal cross-sectional view of the RF tag in accordance with the embodiment.

The RF tag 1 includes, as illustrated in FIG. 10, an RF tag element 100 and a case 300 that accommodates this RF tag element 100. The RF tag element 100 is fixed to the case 300 via an adhesive layer 400 provided on an inner surface 304 of the case 300. The adhesive layer 400 is formed as a result of curing of an adhesive. By accommodating the RF tag element 100 in the case 300, waterproof or dustproof property can be enhanced.

The case 300 is made, for example, from ABS resin and fiber reinforced plastics (FRP), but it is not limited thereto. Note that the case 300 is a rectangular parallelepiped shape in this embodiment but it is not limited thereto, and may have a disc-like shape. Alternatively, it may have a shape corresponding to the surface shape of the target object of mounting.

Also, materials such as non-woven fabric, a Teflon (registered trademark) foam member, a silicone foam member, PPS (polyphenylene sulfide), PP (polypropylene), any other suitable super engineering plastics, PES, PEI, PAI, PEEK, PTFE, PC, PA, PET, PBT, etc., or any other suitable composite materials thereof may be used as the case 300.

Figure 11:
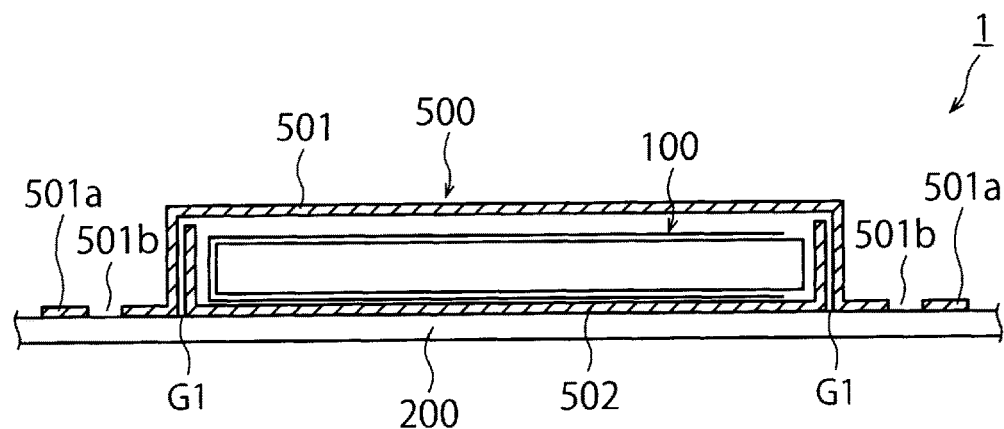
FIG. 11 is a longitudinal cross-sectional view of an RF tag having a case in which a hole is provided as a mounting unit.

The case 300 may have a mounting unit for mounting the RF tag 1 to the target object of mounting. This mounting unit is, for example, as illustrated in FIG. 10, an adhesive layer 401 formed as a result of curing of an adhesive. Also, as the mounting unit, a fixing hole may be provided in the case. The case 500 illustrated in FIG. 11 has a housing 501 whose lower surface is an open surface and a lid 502 whose upper surface is an open surface. This lid 502 is accommodated in the housing 501 in the state where the RF tag element 100 is accommodated in the inside of the lid 502. The housing 501 includes an outer edge section 501a extending from its left and right side surfaces. Provided in this outer edge section 501*a* is a hole 501*b*. By using this hole 501*b*, the case 500 can be fixed to the target object of mounting such as the conductor 200 by means of a fixing means such as a screw, a bolt and a nut, a peg, or the like. Note that the gap G1 created between the inner surface of the housing 501 and the outer surface of the lid 502 may be filled with an adhesive. By virtue of this, the watertight and dustproof properties of the case 500 can be enhanced.

In addition, as the mounting unit, a suspension hole (not shown) may be provided in the case. In this case, a string is passed through the suspension hole and the RF tag 1 is suspended from the target object of mounting by means of the string.

Note that the case in which the RF tag element 100 is accommodated may be configured such that the position of the short circuit section 60 is visible from the outside of the case. For example, a marking or the like indicative of the position of the short circuit section 60 is printed on the outer surface of the case (e.g., the upper surface 301 or the side surface 302 and the like of the case 300). Alternatively, the position of the short circuit section 60 may be made visible from the outside by adjusting the outer shape of the case 300. For example, a raised section or recessed section is provided at a portion of the outer surface of the case 300 corresponding to the position of the short circuit section 60.

By configuring the case such that the position of the short circuit section 60 is visible from the outside of the case, when the multiple RF tags 1 are mounted to the conductor 200, the RF tags 1 can be readily installed such that the short circuit section 60 is oriented toward the end of the conductor 200. As a result, as has been discussed in the foregoing, operation efficiency of the RF tags 1 can be improved and radio waves can be efficiently radiated.

Also, a biasing member that presses the RF tag element 100 may be provided in the RF tag 1. Specifically, a biasing member configured to press the RF tag element 100 toward the second inner surface facing the first inner surface may be provided in the gap between the RF tag element 100 and the first inner surface of the case.

Figure 12:
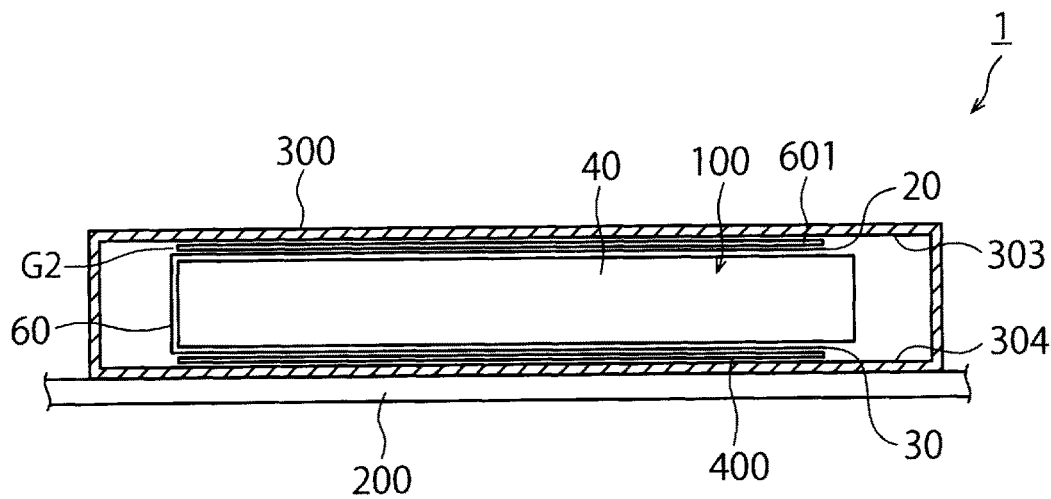
FIG. 12 is a longitudinal cross-sectional view of an RF tag having an adhesive layer as a biasing member.

For example, as illustrated in FIG. 12, an adhesive layer 601 is provided as the biasing member in the gap G2 between the RF tag element 100 and the inner surface 303 of the case 300. This adhesive layer 601 is a layer formed as a result of curing of an adhesive, the gap G2 is filled with the adhesive layer 601, and its thickness is larger than the thickness of the gap G2. As a result, the adhesive layer 601 presses the RF tag element 100 toward the inner surface 304 facing the inner surface 303. Accordingly, the RF tag element 100 is firmly pressed against the side of the inner surface 304 by the adhesive layer 601.

Figure 13:
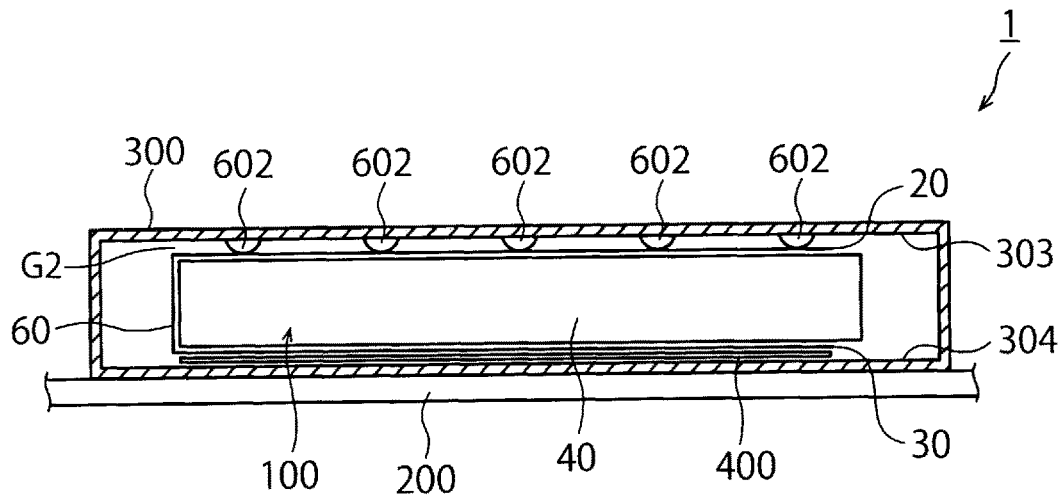
FIG. 13 is a longitudinal cross-sectional view of an RF tag having a case in which a projection is provided as a biasing member.
Figure 14A:
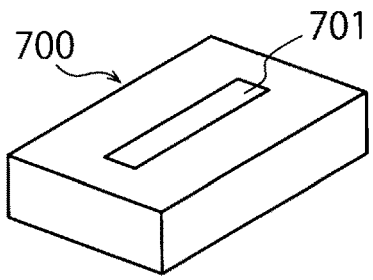
FIG. 14A is a perspective view of a conductive case in which an opening is provided.
Figure 14B:
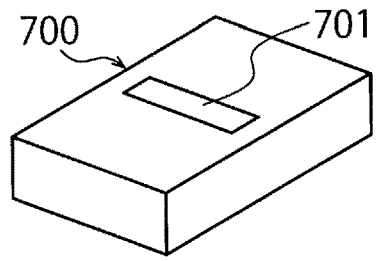
FIG. 14B is a perspective view of a conductive case in which an opening is provided.
Figure 14C:
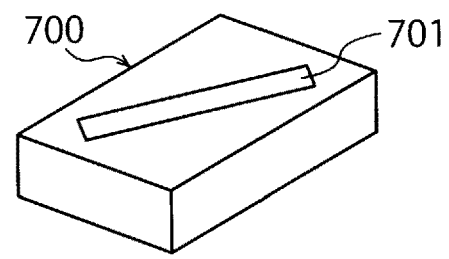
FIG. 14C is a perspective view of a conductive case in which an opening is provided.
Figure 14D:
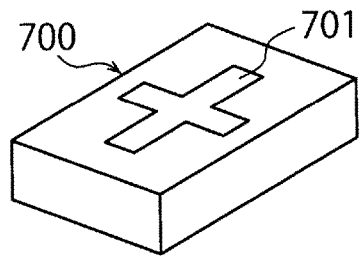
FIG. 14D is a perspective view of a conductive case in which an opening is provided.
Figure 14E:
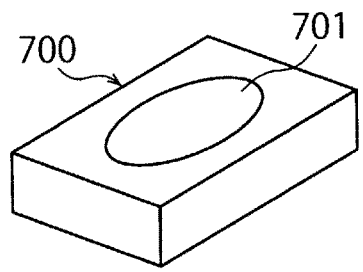
FIG. 14E is a perspective view of a conductive case in which an opening is provided.

As another embodiment associated with the biasing member, as illustrated in FIG. 13, a projection (rib) 602 may be provided on the inner surface 303 of the case 300. Specifically, the projection 602 configured to press the RF tag element 100 toward the inner surface 304 may be provided on the inner surface 303 of the case 300. Note that the inner surface 303 may be the lower inner surface of the case 300.

With regard to the biasing member, various modes other than those described above can be contemplated. For example, a member made of materials having stretching properties such as urethane, a spring or the like made of resin may be provided as the biasing member between the RF tag element and the case.

Note that the biasing member is preferably made of the same material as the insulating base material.

Also, it is desirable that the relative permittivity of the biasing member and the relative permittivity of the insulating base material are at the same or similar level. In particular, it is desirable that the relative permittivities agree with each other.

By providing a biasing member as described above, the antenna sensitivity of the RF tag 1 can be enhanced. Further, even when vibrations are applied to the case, it is made possible to avoid oscillation of the RF tag element 100 inside the case, which in turn makes it possible to achieve longer product life of the RF tag element 100.

Also, the case in which the RF tag element 100 is accommodated may be made of conductive materials such as metal. In this case, an opening for passage of radio waves is provided in a case made of conductive material. As illustrated in FIGS. 14A to 14E, an opening 701 for passage of the radio waves of the reading device is provided in the case 700 made of conductive material. For example, the opening 701 is provided in the upper surface of the case 700 (i.e., the surface facing the reading device). The radio waves that have passed through this opening 701 are received by the RF tag element 100 accommodated in the case 700.

It is preferable that the opening 701 have a shape corresponding to the characteristics of the radio waves transmitted from the reading device. For example, the shape of the opening 701 can be modified as appropriate according to the characteristics of the radio waves such as a linear shape illustrated in FIGS. 14A to 14C, a shape defined by two lines intersecting each other illustrated in FIG. 14D, an elliptical shape illustrated in FIG. 14E, etc. Note that the shape of the opening 701 is not limited to a rectangular shape, a cross shape, or a circular shape (elliptical shape) and may be any other suitable shape, for example, a star-like shape. Also, it is preferable that the area of the opening 701 is about 10% of the surface area of the case 700 (the sum of the area of the upper surface and the areas of the front, rear, left, and right side surfaces), but it may be adjusted as appropriate depending on the types of the radio waves and the installation location of the case.

Figure 15:
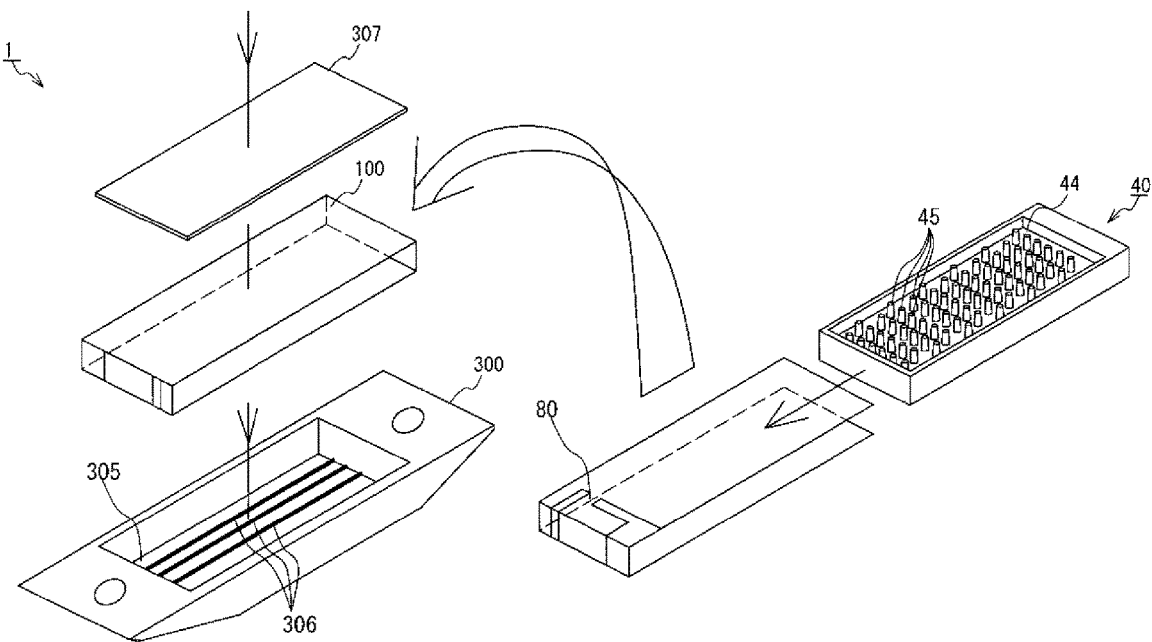
FIG. 15 is a schematic diagram illustrating another example of how to assemble an RF tag 1.

FIG. 15 is a schematic diagram which illustrates another example of how to assemble the RF tag 1.

In the RF tag 1 illustrated in FIG. 15, a rectangular hole 44 is provided on the side of the waveguide element 20 of the insulation member 40.

Also, a plurality of cylindrical columns (a plurality of convex pillars) 45 are formed in the bottom surface of the hole 44. Note that, in FIG. 15, the plurality of cylindrical columns 45 are formed with the same shape, but they are not limited to this, and any suitable shapes may be mixedly used such as a square prism, a triangular prism, and the like, or any suitable shape such as a square prism, a triangular prism, and the like, may be mixedly used only for some of them, and the plurality of cylindrical columns 45 may have different heights.

Further, the plurality of cylindrical columns 45 are regularly formed in a staggered pattern, but they are not limited to this, and they may be formed in arrangement according to random numbers.

Next, the insulation member 40 is, for example, a dielectric body having a relative permittivity of one or more and 20 or less (for example, synthetic resin such as ABS resin, ceramic, styrofoam, etc.). If a dielectric body having a large permittivity (e.g., ceramic) is used, then the capacitance of the capacitor constituted by the waveguide element 20, the waveguide element 30, and the insulation member 40 (the capacitor 90 which will be described later) becomes large, so that the opening area of the waveguide elements 20 and 30 is reduced, and the size of the RF tag element 100 can be reduced.

Meanwhile, as the gain of the RF tag antenna 10 becomes smaller, the distance within which communication can be performed with the reading device (communication distance) is shortened. In the case where a relatively long communication distance in the order of several meters or more is needed, it is preferable that a dielectric body having a small permittivity (e.g., relative permittivity of 5 or less, and more preferably, for example, relative permittivity of 2 or less) be used as the insulation member 40.

Also, it may be made of materials such as non-woven fabric, a Teflon (registered trademark) foam member, a silicone foam member, PPS (polyphenylene sulfide), PP (polypropylene), any other suitable super engineering plastics, PES, PEI, PAI, PEEK, PTFE, PC, PA, PET, PBT, etc., or any other suitable composite materials thereof.

After that, as illustrated in FIG. 15, the RF antenna 10 is adhesively attached to the insulation member 40 and the IC chip 80 is mounted. As a result, the RF tag element 100 is formed.

Subsequently, as illustrated in FIG. 15, a hole 305 which is capable of accommodating the RF tag element 100 is formed in the case 300. Also, a plurality of ribs 306 which are a support member are formed in the bottom surface of the hole 305. In FIG. 15, three ribs 306 are formed. The rib 306 is for use in supporting the RF tag element 100 and, in addition to them, an additional rib may be provided in the side surface of the hole 305. By virtue of this, it is made possible to create a gap between the RF tag element 100 and the case 300. Also, the side of the RF tag element 100 where the IC chip 80 is mounted is arranged on the side of the rib 306 of the case.

Note that the case 300 and the lid 307 are preferably formed of the same material. Further, it is preferable that the case 307 and the insulation member 40 be formed of the same material.

The RF tag element 100 is accommodated in the hole 305 of the case 300, and the hole 305 in which the RF tag element 100 has been accommodated is closed by the lid 307. In this case, the case 300 and the lid 307 may be fixed to each other by adhesive bonding or may be fixed to each other by fusion, welding, or any other suitable method of fixing.

Also, the case 300 may be made of materials such as non-woven fabric, a Teflon (registered trademark) foam member, a silicone foam member, PPS (polyphenylene sulfide), PP (polypropylene), and any other suitable super engineering plastics, PES, PEI, PAI, PEEK, PTFE, PC, PA, PET, PBT, etc. or any other composite materials thereof. For example, if the case 300, the insulation member 40, and the lid 307 are formed of resin having a heat resistance property (materials such as PPS (polyphenylene sulfide), PP (polypropylene), any other suitable super engineering plastics, PES, PEI, PAI, PEEK, PTFE, PC, PA, PET, PBT, etc., or any other suitable composite materials thereof), then the RF tag element 100 accommodated in the case 300 having a heat resistance property, i.e., the RF tag 1 can be formed.

Note that the RF tag element 100 accommodated in the case 300 and the RF tag 1 have the feature that they are capable of communications regardless of their position of installation on a conductor such as a metal plate.

EXAMPLE

Figure 16:
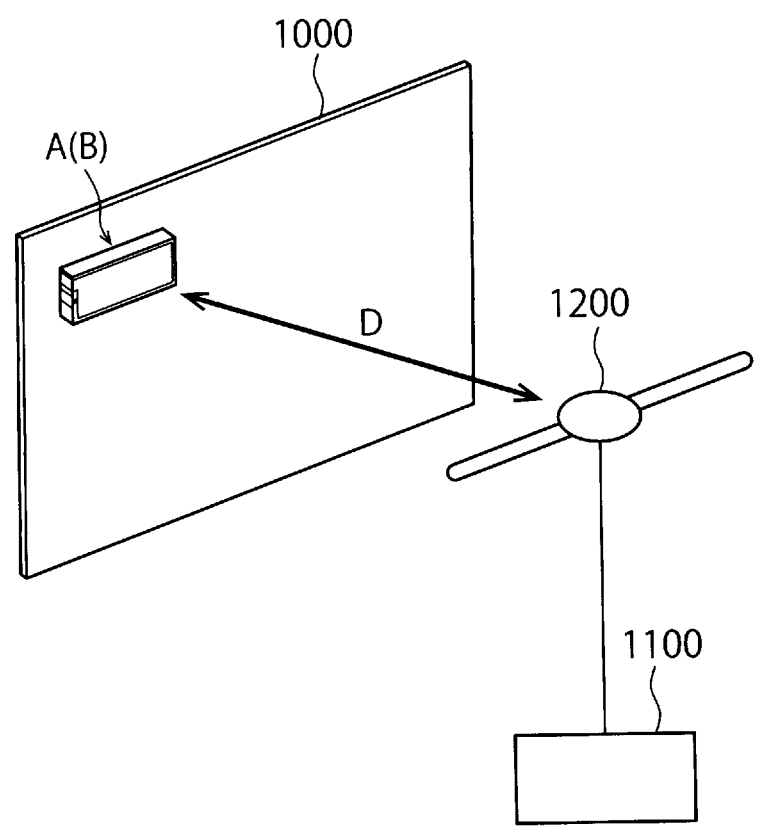
FIG. 16 is diagram illustrating a measurement system for measuring a minimum communication-possible gain of an RF tag element.

FIG. 16 illustrates a measurement system for measuring the minimum communication-possible gain of the RF tag element. Mounted on the acrylic plate 1000 is the RF tag element A or B. The RF tag element A is the RF tag element in accordance with the embodiment of the present invention, and, as the insulation member, ABS resin plate is used with a plurality of bottomed holes provided on its surface on the side of the standard antenna 1200. Meanwhile, the RF tag element B is an RF tag element of a conventional type, and styrofoam plate is used as an insulation member. The styrofoam plate has a flat plate-like shape and no bottomed hole is provided therein. Note that, with regard to the RF tag elements A and B, features other than the insulation member and the sizes are identical with each other.

The specified distance D between the RF tag elements A and B and the standard antenna 1200 was set to 300 mm.

The reading device 1100 measures the minimum gain that allows communications with the RF tag elements A and B. The communication frequency was set to 920 MHz. Note that, when the minimum communication-possible gain is smaller, then the antenna sensitivity of the RF tag element becomes more favorable, making it possible to extend the communication distance.

As a result of the measurement in the above-described measurement system, it has been found that the minimum communication-possible gain of the RF tag element A is 16.5 dB. In contrast, the minimum communication-possible gain of the RF tag element B using a styrofoam plate was 19.8 dB. From this fact, it will be appreciated that the RF tag element A has a significantly enhanced antenna sensitivity as compared with the RF tag element B.

The permittivity of ABS resin (permittivity 3.1) is larger than the permittivity of styrofoam (permittivity 2.1), so that, if the insulation members have the same shape, then the gain of the RF tag antenna 10 becomes smaller and the communication distance becomes shorter in the RF tag element A than in the RF tag element B. However, in the RF tag element A, since the permittivity of the insulating region A1 is lowered by providing a plurality of bottomed holes, antenna sensitivity is enhanced despite the fact that the RF tag element A has the same size as the RF tag element B.

In the present invention, the insulation member 40 corresponds to the "insulation member," the waveguide element 20 corresponds to the "first waveguide element," the waveguide element 30 corresponds to the "second waveguide element," the power feeding section 50 corresponds to the "power feeding section," the short circuit section 60 corresponds to the "short circuit section," the planar inverted-F antenna or the F antenna corresponds to the "planar inverted-F antenna or the F antenna," the insulating region A1 on the side of the waveguide element 20 corresponds to the "permittivity of the first insulating region," the insulating region A2 on the side of the waveguide element 30 corresponds to the "permittivity of the second insulating region," the RF tag antenna 10 corresponds to the "RF tag antenna," the a plurality of bottomed holes 41 corresponds to the "a plurality of bottomed holes," a plurality of cylindrical columns 45 correspond to "a plurality of convex pillars," the IC chip 80 corresponds to the "IC chip," the RF tag 1 corresponds to the "RF tag," the RF tag element 100 corresponds to the "RF tag element," the case 300, 700 corresponds to the "case," the adhesive layer 601, the rib 306, and the rib 602 correspond to the "biasing member," the opening 701 corresponds to the "opening," the hole 305 corresponds to the "accommodating section," and the rib 306 corresponds to the "support member."

Whilst those skilled in the art will envisage additional effects of and various modifications to the present invention on the basis of the foregoing descriptions, aspects of the present invention are not limited to the above-described embodiments. Various additions, changes, and partial deletions can be made within the range where the conceptual idea and the purport of the present invention are not deviated which are derived from the content of the scope of claims and equivalents thereof. For example, although the explanations have been provided based on an inverted-F antenna, the present invention is not limited thereto and may be implemented on an F antenna, a slot antenna, a loop antenna, etc.

REFERENCE SIGNS LIST

1 RF tag
10 RF tag antenna
20, 30 waveguide element
40 insulation member
40A, 40B insulating substrate
41 bottomed hole
42, 43 groove
50 power feeding section
60 short circuit section
70 sheet
80 IC chip
90 capacitor
100 RF tag element
200 conductor
201 installation surface
202 non-installation surface
300, 500, 700 case
301 upper surface (of the case)
302 side surface (of the case)
303, 304 inner surface (of the case)
400, 401 adhesive layer
501 housing
501a outer edge section
501b hole
502 lid
601 adhesive layer
602 projection
701 opening
1000 acrylic plate
1100 reading device
1200 standard antenna
A, B RF tag element
A1, A2 insulating region
D specified distance
G1, G2 gap
L inductor pattern

What is claimed is:

1. An RF tag antenna comprising:
an insulation member;
a first waveguide element provided on one side of the insulation member;
a second waveguide element arranged so as to face the first waveguide element, the second waveguide element being provided on another side of the insulation member;
a power feeding section having one end electrically connected to the second waveguide element; and
a short circuit section having one end electrically connected to the first waveguide element and another end electrically connected to the second waveguide element, wherein
the first waveguide element, the second waveguide element, the insulation member, the power feeding section, and the short circuit section constitute a planar inverted-F antenna or F antenna configured to receive radio waves transmitted from a reading device;
a first insulating region and a second insulating region are defined within a region between the first waveguide element and the second waveguide element, the first insulating region facing the first waveguide element and the second insulating region facing the second waveguide element, a permittivity of the first insulating region and a permittivity of the second insulating region being different from one another;
the insulation member has a first main surface on the one side and a second main surface on the other side, and a plurality of bottomed holes are provided in the first main surface; and
diameters of the plurality of bottomed holes are gradually reduced from the first main surface toward the second main surface.

2. The RF tag antenna according to claim 1, wherein the permittivity of the first insulating region is smaller than the permittivity of the second insulating region when the first waveguide element functions as a waveguide conductor that absorbs the radio waves and the second waveguide element functions as a ground conductor.

3. An RF tag comprising:
the RF tag antenna according to claim 1; and
an IC chip that operates based on the radio waves transmitted from the reading device, in which:
the second waveguide element is arranged to be in contact with a conductor, and
the permittivity of the second insulating region is larger than the permittivity of the first insulating region.

4. An RF tag comprising:
an RF tag element having
the RF tag antenna according to claim 1 and
an IC chip that operates based on radio waves transmitted from the reading device; and
a case that stores the RF tag element, the case having a mounting unit for mounting the RF tag to a target object of mounting.

5. The RF tag according to claim 4, wherein the case is configured such that a position of the short circuit section is visible from an outside of the case.

6. The RF tag according to claim 4, wherein a biasing member is provided in a gap between the RF tag element and a first inner surface of the case, the biasing member being configured to press the RF tag element toward a second inner surface of the case facing the first inner surface.

7. The RF tag according to claim 4, wherein
the case is made of a conductive material, and
an opening through which radio waves transmitted from the reading device pass, is provided in the case.

8. The RF tag according to claim 4, wherein the case and the insulation member are made of the same material.

9. The RF tag according to claim 4, wherein
the case has an accommodating section configured to accommodate the RF tag element that includes the RF tag antenna and the IC chip that operates based on the radio waves transmitted from the reading device, and
a support member that supports the RF tag element is formed in the accommodating section.

10. An RF tag antenna comprising:
an insulation member;
a first waveguide element provided on one side of the insulation member;
a second waveguide element arranged so as to face the first waveguide element, the second waveguide element being provided on another side of the insulation member;

a power feeding section having one end electrically connected to the second waveguide element; and a short circuit section having one end electrically connected to the first waveguide element and another end electrically connected to the second waveguide element, wherein the first waveguide element, the second waveguide element, the insulation member, the power feeding section, and the short circuit section constitute a planar inverted-F antenna or F antenna configured to receive radio waves transmitted from a reading device;

a first insulating region and a second insulating region are defined within a region between the first waveguide element and the second waveguide element, the first insulating region facing the first waveguide element and the second insulating region facing the second waveguide element, a permittivity of the first insulating region and a permittivity of the second insulating region being different from one another;

the insulation member has a first main surface on the one side and a second main surface on the other side, and raised and depressed sections are formed on the first main surface and/or the second main surface; and the shapes of the raised and depressed sections are different from each other on the first main surface and the second main surface.

11. An RF tag antenna comprising:

an insulation member;

a first waveguide element provided on one side of the insulation member;

a second waveguide element arranged so as to face the first waveguide element, the second waveguide element being provided on another side of the insulation member;

a power feeding section having one end electrically connected to the second waveguide element; and a short circuit section having one end electrically connected to the first waveguide element and another end electrically connected to the second waveguide element, wherein the first waveguide element, the second waveguide element, the insulation member, the power feeding section, and the short circuit section constitute a planar inverted-F antenna or F antenna configured to receive radio waves transmitted from a reading device;

a first insulating region and a second insulating region are defined within a region between the first waveguide element and the second waveguide element, the first insulating region facing the first waveguide element and the second insulating region facing the second waveguide element, a permittivity of the first insulating region and a permittivity of the second insulating region being different from one another; and the insulation member has a first main surface on the one side and a second main surface on the other side, and a hole is formed in the first main surface and/or the second main surface, and a plurality of convex pillars are formed on a bottom surface of the hole.

12. The RF tag antenna according to claim 11, wherein the shapes of convex pillars are different from each other on the first main surface and the second main surface.

13. An RF tag comprising:

an RF tag element having
an RF tag antenna and
an IC chip that operates based on radio waves transmitted from the reading device;

a case that stores the RF tag element, the case having a mounting unit for mounting the RF tag to a target object of mounting; and a biasing member is being provided in a gap between the RF tag element and a first inner surface of the case, the biasing member being configured to press the RF tag element toward a second inner surface of the case facing the first inner surface, wherein the RF tag antenna comprises:

an insulation member;

a first waveguide element provided on one side of the insulation member;

a second waveguide element arranged so as to face the first waveguide element, the second waveguide element being provided on another side of the insulation member;

a power feeding section having one end electrically connected to the second waveguide element; and a short circuit section having one end electrically connected to the first waveguide element and another end electrically connected to the second waveguide element, wherein the first waveguide element, the second waveguide element, the insulation member, the power feeding section, and the short circuit section constitute a planar inverted-F antenna or F antenna configured to receive radio waves transmitted from a reading device; and a first insulating region and a second insulating region are defined within a region between the first waveguide element and the second waveguide element, the first insulating region facing the first waveguide element and the second insulating region facing the second waveguide element, a permittivity of the first insulating region and a permittivity of the second insulating region being different from one another.

* * * * *